United States Patent Office 3,574,759
Patented Apr. 13, 1971

3,574,759
PERFLUORODICYANAMIDE AND METHOD
Simon Frank and Marion Douglas Meyers, Stamford, Conn., assignors to American Cyanamid Company, Stamford, Conn.
No Drawing. Filed May 11, 1962, Ser. No. 195,020
Int. Cl. C07c 87/22
U.S. Cl. 260—583    10 Claims This invention relates to a new and useful perfluorinated compound and to a method of preparing the same. More particularly it is concerned with perfluorodicyanamide, the formula for which is I 

and to a method of making it.

Perfluorodicyanamide is useful, for example, as an oxidizer, as an explosive, as an intermediate in the synthesis of other chemical compounds that are useful as oxidizers in rocket-propellant formulations and for other purposes.

No pertinent prior art is known. Virtually no satisfactory techniques previously have been known for the direct introduction of fluorine into even simple nitrogen-containing molecules. Characteristic of reactions involving elemental fluorine are uncontrolled combustions leading to the formation of $CF_4$, $NF_3$, $N_2$, etc. Often such reactions yield complex product mixtures resulting from recombination of the many free-radical species available by fragmentation of the starting materials. Probably the best-known example of a "successful" fluorination which yielded interesting N–F products was Ruff's fluorination of silver cyanide by passing fluorine-containing gases through a mixture of powdered $CaF_2$ and AgCN [L. Bigelow, Chem. Rev., 40, 60 (1947)].

The present invention is based on our discovery of technique whereby the dicyanamide anion can be perfluorinated as represented by the following equation:

II 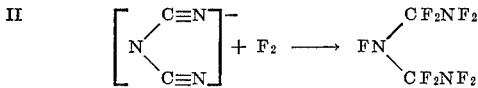

More particularly the instant invention resulted from our discovery that perfluorodicyanamide (hereafter for brevity often referred to as "PFDC") can be produced by the fluorination of a metal compound of dicyanamide, specifically zinc dicyanamide, using the so-called "fluid-bed" technique hereafter more fully described. The technique makes possible the controlled addition of fluorine to the dicyanamide anion without material degradation of the said anion.

The apparatus used in practicing the method features of our invention comprises means for passing (preferably upwardly passing) gaseous fluorine ($F_2$) through a mass or bed of zinc dicyanamide or other suitable metal compound of dicyanamide in finely divided (particulate) state, e.g., from 40- to 200-mesh (U.S. Standard Sieve Series) fineness. Preferably the zinc dicyanamide (or its equivalent) is admixed with a finely divided solid diluent or additive which dilutes the zinc dicyanamide reactant and/or may serve to catalyze the reaction. Zinc fluoride is the preferred diluent. Other examples of solid diluents for the zinc dicyanamide that would be suitable for use are the fluorides of calcium, magnesium, strontium, barium and scandium; the alkali-metal (sodium, potassium, lithium, cesium and rubidium) fluorides; $Al_2O_3$; $Na_3AlF_6$; and $Na_2SiF_6$. The solid, particulate diluent or diluents for the zinc dicyanamide reactant are generally of approximately the same particle size as the finely divided zinc dicyanamide reactant, e.g., from 40- to 200-mesh fineness.

The fluorination of the zinc dicyanamide reactant to obtain fluorination products including perfluorodicyanamide is more easily controlled by diluting the fluorine gas with an inert carrier gas. Any suitable inert carrier gas can be used, for example, helium, argon, nitrogen, neon, etc. The concentration of the gaseous fluorine in the diluent gas can be varied as desired or as conditions may require, for example, from 1:20% by volume of the gaseous fluorine to 99:80% by volume of the diluent gas. Preferably the concentration of the gaseous fluorine in the diluent gas is within the range of from about 1% to about 10% by volume of the mixed gases.

Any suitable form of reactor and auxiliary components can be used in practicing the method of this invention. For example, the reactor conveniently may be in the form of a U having extended legs with the base of the U and portions of each of the legs supported in a receptacle provided with means for controlling the temperature.

The gaseous fluorine admixed with a diluent carrier gas is introduced into the upper part of one of the aforementioned extended legs of the U of the reactor, this leg preferably being narrower in diameter, at least in the portion constituting the reaction zone, than the other leg. This other leg (reaction leg) is fitted with a porous support, e.g., a fine screen of Monel metal or other suitable material, at a suitable position in the said leg. The position of this porous support conveniently may be, for example, near the base of the U and at a point before the diameter of the leg increases to form the reaction zone. An outlet line leads off from the side of the upper part of the reaction legs to carry off the reaction products. A closure-means for the upper end of the reaction leg is provided with a thermocouple well so that temperature-recordings can be made of the temperature of the reaction mass.

The finely divided zinc dicyanamide or its equivalent, preferably admixed with a finely divided diluent or additive, is introduced into the aforementioned reaction leg where it is supported by the aforesaid porous support. The proportions of zinc dicyanamide and additive can be varied as desired or as conditions may require. Usually, however, the additive is employed in an amount corresponding to, by weight, from about 10% to about 80%, more particularly about 50%, of the total amount of additive and zinc dicyanamide.

The temperature of the reaction can be varied somewhat, e.g., from about 0° C. to about 60°–70° C. Higher yields of PFDC are obtained when the temperature is maintained at the lower end of this range, e.g., at from about 0° C. to about 25° C. and, more particularly, about 15° C.

The reaction products are drawn off from the reaction zone, together with unreacted gaseous fluorine and diluent carrier gas through the aforementioned outlet line leading from the reaction leg. The reaction products including perfluorodicyanamide are collected by any suitable means, for instance in a series of traps maintained at appropriate temperatures. PFDC and any other fluorinated compounds that may have been formed are isolated from the reaction products by suitable techniques, e.g., by repeated fractional co-distillations in known manner.

Although it cannot be stated with certainty it is believed that the fluorination of the dicyanamide anion proceeds as represented by the following:

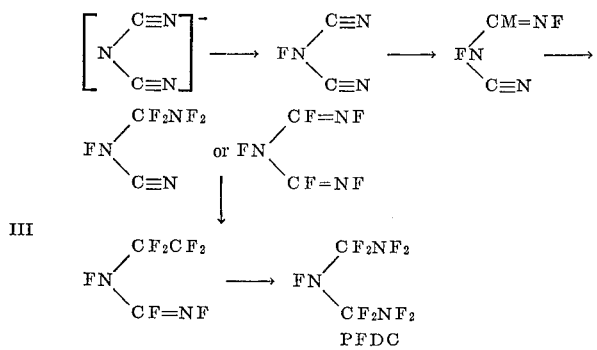

It will be understood, of course, by those skilled in the art that the foregoing description of apparatus that can be used in practicing the present invention is typical of apparatus employed in small-scale, e.g., laboratory-scale, operations. For larger scale or commercial operations, fluid-bed reactors of the general design and arrangement employed, for instance, in the arts of petroleum refining and petrochemicals, suitably modified where necessary, can be used.

In order that those skilled in the art may better understand how the present invention can be carried into effect, the following examples are given by way of illustration and not by way of limitation. All percentages are by weight unless otherwise stated.

EXAMPLE 1

Five (5) g. of zinc dicyanamide admixed with 5 g. of zinc fluoride, the mixture being of about 50 to 100 mesh (U.S. Standard Sieve Series Number) fineness, is placed in a glass reactor of the kind hereinbefore described and which is surrounded by an ice bath. The solid mixture (supported on a coarse fritted disk) is first fluidized with a stream of helium gas. Then a stream of gaseous fluorine ($F_2$) is introduced into the flowing helium stream and its concentration in the helium stream is gradually increased until an equilibrium temperature of 8°–10° C. is attained. The total flow rate of helium carrier gas containing about 3% by volume of $F_2$ is approximately 1 liter per minute. The reaction is continued for 5 hours. Volatile products are collected in liquid nitrogen traps. Perfluorodicyanamide (about 1.8 g.) is separated from the crude product by bulb-to-bulb distillation. Final purification is achieved using fractional co-distillation technique in known manner [Anal. Chem. 31, 618 (1959)].

The properties of the isolated and purified PFDC are as follows:

Table I

Molecular weight (by gas density): Calc'd, 273; found 238
Boiling point: 29° C., from log $P_{mm} = 8.19 - 1601/T$
Oxidizing power: Calc'd, 42 meq. $I$/g.; found, 31
Total fluorine by Schlumberger NMR: Calc'd, 72.2%; found, 70±3%
$F^{19}$ nuclear magnetic resonance spectrum:

| $\phi$, in p.p.m. | Relative area | Appearance | Assignment |
|---|---|---|---|
| −19.5 | 4 | Medium, broad | −NF$_2$ |
| 87.5 | 1 | Weak, broad | >NF |
| 101.8 | 4 | Strong, sharp doublet, split by 19.5 cps. | −N−CF$_2$*−NF$_2$ <br>                                     F |

*Indicates group considered.

EXAMPLE 2

Same as in Example 1 with the exception that, instead of using helium as the inert carrier gas, gaseous argon is employed. Similar results are obtained.

EXAMPLE 3

Essentially the same procedure is followed as described in Example 1 with the exception that the fluid bed is composed of 6 g. of finely divided zinc dicyanamide and 6 g. of finely divided zinc fluoride as diluent; the reaction temperature is maintained between 4° C. and 10° C.; the total reaction time is 16 hours; the concentration of $F_2$ in the gaseous helium is 1% by volume; and the flow rate is 300 ml. per minute. Additional details on the collection conditions and results are given in Table II.

TABLE II

| Fraction: | Weight, grams | Passed trap at, °C. | Retained in trap at, °C. | Molecular[a] weight found | Number of[b] components | Major components, by IR |
|---|---|---|---|---|---|---|
| I | 3.4 | −126 | −196 | 87 | 3 large peaks, 2 small. | NF$_3$, COF$_2$, CF$_3$NF$_2$ |
| II | 2.6 | −95 | −126 | 116 | 3 large peaks with 4 small. | CF$_3$NF$_2$, CF$_2$(NF$_2$)$_2$, COF$_2$ |
| III | 4.3 | −35 | −95 | 172 | 1 large peak with 2 small. | FN(CF$_2$(NF$_2$)$_2$)(CF$_3$), FN(CF$_2$NF$_2$)$_2$ |
| IV | 0.3 | | −35 | 197 | 1 large peak | FN(CF$_2$NF$_2$)$_2$ |
| Total | 10.6 | | | | | |

[a] Gas density.
[b] Co-distillation.

EXAMPLE 4

Essentially the same procedure is followed as described under Example 3, with the exception noted below, in a series of two runs (A and B) in one of which the reaction temperature is maintained within the range of 60°–70° C. (Run A) while in the other it is maintained within the range of 4°–10° C. (Run B). The exception to the procedure in this example from that of Example 3 is that in Run A the zinc dicyanamide is used without any zinc fluoride as a diluent. The products obtained and their approximate yield by volume as determined by fractional co-distillation, $F^{19}$ nuclear magnetic resonance and infrared analyses are shown in Table III.

TABLE III

| Run | Reaction temperature, °C | Products, percent by volume | | | | |
|---|---|---|---|---|---|---|
| | | $CF_4$ and $NF_3$ | $CF_3NF_2$ | $(CF_3)_2NF$ | $CF_2(NF_2)_2$ | $FN(CF_2NF_2)_2$ |
| A | 60–70 | 7% | 60% | 4% | 20% | About 5%. |
| B | 4–10 | 10% mostly $NF_3$. | Moderate | Trace | About 20% | About 10%. |

NOTE:
$CF_3NF_2$ is trifluoromethyldifluoroamine.
$(CF_3)_2NF$ is bis(trifluoromethyl)fluoroamine.
$CF_2(NF_2)_2$ is bis(difluoroamino)difluoromethane.
$FN(CF_2NF_2)_2$ is perfluorodicyanamide.

EXAMPLE 5

This example shows the utility of perfluorodicyanamide as an explosive.

Into a capillary tube, 1 mm. in diameter and open at one end, is placed a small sample (about 0.1 g.) of PFDC, which is a liquid (B.P. 29° C.) at room temperature. The end of the tube is sealed. The tube is placed on a steel plate and struck with a hammer. The tube breaks and the PFDC explodes sharply and violently, yielding only gaseous products. One possible explanation for the decomposition is represented by the following equation:

$$FN(CF_2NF_2)_2 \rightarrow CF_3CF_3 + NF_3 + N_2$$

This explosive effect of PFDC can be used advantageously in rocket propellants or wherever an explosive action is desired.

We claim:

1. Perfluorodicyanamide.

2. The method of preparing fluorinated compounds including perfluorodicyanamide which comprises contacting finely divided zinc dicyanamide with a mixture of gaseous fluorine and an inert carrier gas, said zinc dicyanamide being at a temperature within the range of from about 0° C. to about 70° C.; and collecting the reaction products including perfluorodicyanamide.

3. A method as in claim 2 wherein the finely divided zinc dicyanamide is at a temperature within the range of from about 0° C. to about +25° C.

4. The method of preparing fluorinated compounds including perfluorodicyanamide which comprises contacting a fluid bed comprising finely divided zinc dicyanamide with a mixture of gaseous fluorine and an inert carrier gas, said fluid bed being at a temperature within the range of from about 0° C. to about 70° C.; and collecting the reaction products including perfluorodicyanamide.

5. A method as in claim 4 wherein the fluid bed comprises a mixture of finely divided zinc dicyanamide and a finely divided solid diluent for said zinc dicyanamide.

6. A method as in claim 4 wherein the inert carrier gas is gaseous helium.

7. The method of preparing perfluorodicyanamide which comprises contacting a fluid bed comprising finely divided zinc dicyanamide with a mixture of gaseous fluorine and an inert carrier gas, said fluid bed being at a temperature within the range of from about 0° C. to about 70° C.; collecting the products of the reaction; and isolating perfluorodicyanamide from the reaction products.

8. A method as in claim 7 wherein the fluid bed comprises a mixture of finely divided zinc dicyanamide and a finely divided solid diluent for said zinc dicyanamide.

9. A method as in claim 8 wherein the finely divided solid diluent is finely divided zinc fluoride.

10. The method of preparing perfluorodicyanamide which comprises contacting a fluid bed comprising a mixture of finely divided zinc dicyanamide and finely divided zinc fluoride with a mixture of gaseous fluorine and gaseous helium, said fluid bed being at a temperature within the range of from about 0° C. to about 15° C.; collecting the products of the reaction; and isolating perfluorodicyanamide from the reaction products.

References Cited

Hoffman et al., Chem. Reviews, vol. 62, pp. 12 to 18 (1962).

LELAND A. SEBASTIAN, Primary Examiner

U.S. Cl. X.R.

149—109